UNITED STATES PATENT OFFICE.

JOHN HOLLIDAY, OF BROOKLYN, NEW YORK, ASSIGNOR, BY MESNE ASSIGNMENTS, TO READ HOLLIDAY & SONS, OF HUDDERSFIELD, ENGLAND.

MANUFACTURE OF ROSANILINE COLORS.

SPECIFICATION forming part of Letters Patent No. 250,247, dated November 29, 1881.

Application filed December 24, 1877.

*To all whom it may concern:*

Be it known that I, JOHN HOLLIDAY, of Brooklyn, in the county of Kings and State of New York, have invented an Improvement in the Manufacture of Rosaniline Colors, of which the following is a specification.

The coloring-matter which I operate upon is known commercially as "rosaniline," "fuchsine," "magenta," or "aniline-red," these being classed as aniline-reds.

It is well known that, owing to the character of rosaniline, the coloring-matter thereof cannot be employed, either alone or mixed with other coloring-matters, where the process of dyeing or printing requires the employment of an acid or acid mordant.

I have discovered that the aniline-reds before referred to may be converted into new coloring-matters, still retaining the same color possessing acid properties, and thus be rendered capable of being employed in the presence of acids or acid mordants. I submit the before-mentioned rosaniline, separately or conjointly, to the action of sulphuric acid in such a manner as to convert it into a sulpho-conjugated rosaniline, the same being a new article possessing properties different from any rosaniline ever produced before my invention. In order to make the desired conversion, I use about ten pounds of rosaniline, or its salts, (by preference anhydrous chloride of rosaniline,) and dissolve it in about fifty pounds of fuming sulphuric acid. I operate either at the ordinary or at a moderate temperature until the conversion into the new coloring matter or compound is complete. The desired result may be ascertained by testing a portion of the mixture, and when the coloring-matter contained therein is found to be soluble in caustic alkali the operation may be considered at an end. The bulk is then poured into about sixty gallons of water. It is rendered alkaline by means of milk of lime boiled and filtered. The residual sulphate of lime is well washed with boiling water. The filtered solution is evaporated and the color obtained in a solid mass.

Soda or potash may also be employed, instead of lime, in the preparation. In this case the liquid obtained is boiled and filtered, evaporated to a small volume, allowed to cool, and the sulphate of soda crystallizes out. On evaporating the remaining liquor the color is obtained as a green bronze mass. It can be sold or used either in the solid or liquid form, as it dissolves in cold water in any proportion. It dyes by addition of acid to the dye-bath.

This material is especially adapted to use in dyeing and color-printing, either alone or mixed with other colors.

I claim as my invention—

1. The sulpho-conjugated compound of rosaniline, possessing the properties specified, as a new article of manufacture.

2. The method herein specified of manufacturing the within-described sulpho-conjugated compound of rosaniline, substantially as set forth.

Signed by me this 18th day of December, A. D. 1877.

JOHN HOLLIDAY.

Witnesses:
GEO. T. PINCKNEY,
CHAS. H. SMITH.

It is hereby certified that in Letters Patent No. 250,247, granted November 29, 1881, upon the application of John Holliday, for an improvement in "The Manufacture of Rosaniline Colors," the following paragraph, to-wit: "I have found that in making combinations such as described, it is well to employ fuming sulphuric acid gauging from 69 to 70 degrees Beaumé," forming a part of the specification, was inadvertantly omitted after the paragraph ending on line 56 of the printed specification attached to and forming a part of said Letters Patent; that the proper corrections have been made in the files and records of the Patent Office, and are hereby made in said Letters Patent.

Signed, countersigned, and sealed this 13th day of December, A. D. 1881.

[SEAL.]
A. BELL,
*Acting Secretary of the Interior.*

Countersigned:

V. D. STOCKBRIDGE,
*Acting Commissioner of Patents.*